(12) United States Patent
Getzin

(10) Patent No.: US 9,053,199 B2
(45) Date of Patent: Jun. 9, 2015

(54) UNIQUELY IDENTIFYING SCRIPT FILES BY APPENDING A UNIQUE IDENTIFIER TO A URL

(75) Inventor: Jeffrey Getzin, Boonton, NJ (US)

(73) Assignee: Google Inc., Mountain View, CA (US)

( * ) Notice: Subject to any disclaimer, the term of this patent is extended or adjusted under 35 U.S.C. 154(b) by 670 days.

(21) Appl. No.: 13/414,109

(22) Filed: Mar. 7, 2012

(65) Prior Publication Data

US 2013/0238970 A1   Sep. 12, 2013

(51) Int. Cl.
*G06F 17/00*   (2006.01)
*G06F 17/30*   (2006.01)

(52) U.S. Cl.
CPC .................................. *G06F 17/3089* (2013.01)

(58) Field of Classification Search
CPC ................................................... G06F 17/3089
See application file for complete search history.

(56) References Cited

U.S. PATENT DOCUMENTS

| | | | |
|---|---|---|---|
| 6,249,844 B1 * | 6/2001 | Schloss et al. ................ 711/122 |
| RE39,184 E * | 7/2006 | Schloss et al. ................ 711/122 |
| 8,396,920 B1 * | 3/2013 | Pupius et al. ................. 709/203 |
| 8,484,373 B2 * | 7/2013 | Grieve ........................... 709/238 |
| 2003/0182357 A1 * | 9/2003 | Chess et al. .................. 709/203 |
| 2007/0124693 A1 | 5/2007 | Dominowska et al. |
| 2008/0177859 A1 * | 7/2008 | Nickerson ..................... 709/217 |
| 2011/0055314 A1 * | 3/2011 | Rosenstein et al. ........... 709/203 |
| 2011/0055683 A1 * | 3/2011 | Jiang ............................. 715/234 |
| 2012/0036264 A1 * | 2/2012 | Jiang et al. .................... 709/226 |
| 2012/0096058 A1 * | 4/2012 | Mameri et al. ................ 707/827 |

OTHER PUBLICATIONS

Al Zabir, Omar; "Automatic JS, CSS Versioning to Update Browser Cache when Files are Changed"; Jun. 11, 2013; CodeProject.com; pp. 1-10.*

* cited by examiner

*Primary Examiner* — Scott Baderman
*Assistant Examiner* — Asher Kells
(74) *Attorney, Agent, or Firm* — McDermott Will & Emery LLP

(57) ABSTRACT

Described herein are techniques related to uniquely identifying script files. This Abstract is submitted with the understanding that it will not be used to interpret or limit the scope and meaning of the claims. A script file repository includes one or more script files that have unique identifiers and optionally version numbers. A computing device accesses a web document that references a script file using the unique identifier/version number.

26 Claims, 5 Drawing Sheets

UNIQUELY IDENTIFYING SCRIPT FILES BY APPENDING A UNIQUE IDENTIFIER TO A URL

BACKGROUND

A typical web page designer uses a variety of techniques to indicate how a web page should look and feel. For instance, a web page designer uses a markup language to design the look and feel of the web page and then uses one or more scripts, style sheets, images, etc., to indicate any actions or effects for the web page, such as text effects, scrolling marquees, sliding windows, animation, and the like. There are many commonly used files and libraries, e.g., JAVASCRIPT® files and libraries, Cascaded Style Sheets (CSS), image files and libraries, icon files and libraries, and so forth, which can be used when designing a web page.

SUMMARY

In general, one or more implementations of the subject matter disclosed herein are directed to technology that uses a script file repository. The technology includes a web document accessor that is configured to access a web document. The web document includes a uniform resource locator (URL) for a script file and a unique identifier for the script file appended to the URL. The unique identifier uniquely identifies the script file. The script file is included in a script file repository. The technology also includes a script file locator that is configured to determine whether the script file associated with the unique identifier is located at a computing device or at the script file repository. Furthermore, the technology includes a script file obtainer that is configured to obtain the script file associated with the unique identifier from the computing device in response to determining whether the script file associated with the unique identifier is located at the computing device or at the script file repository.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
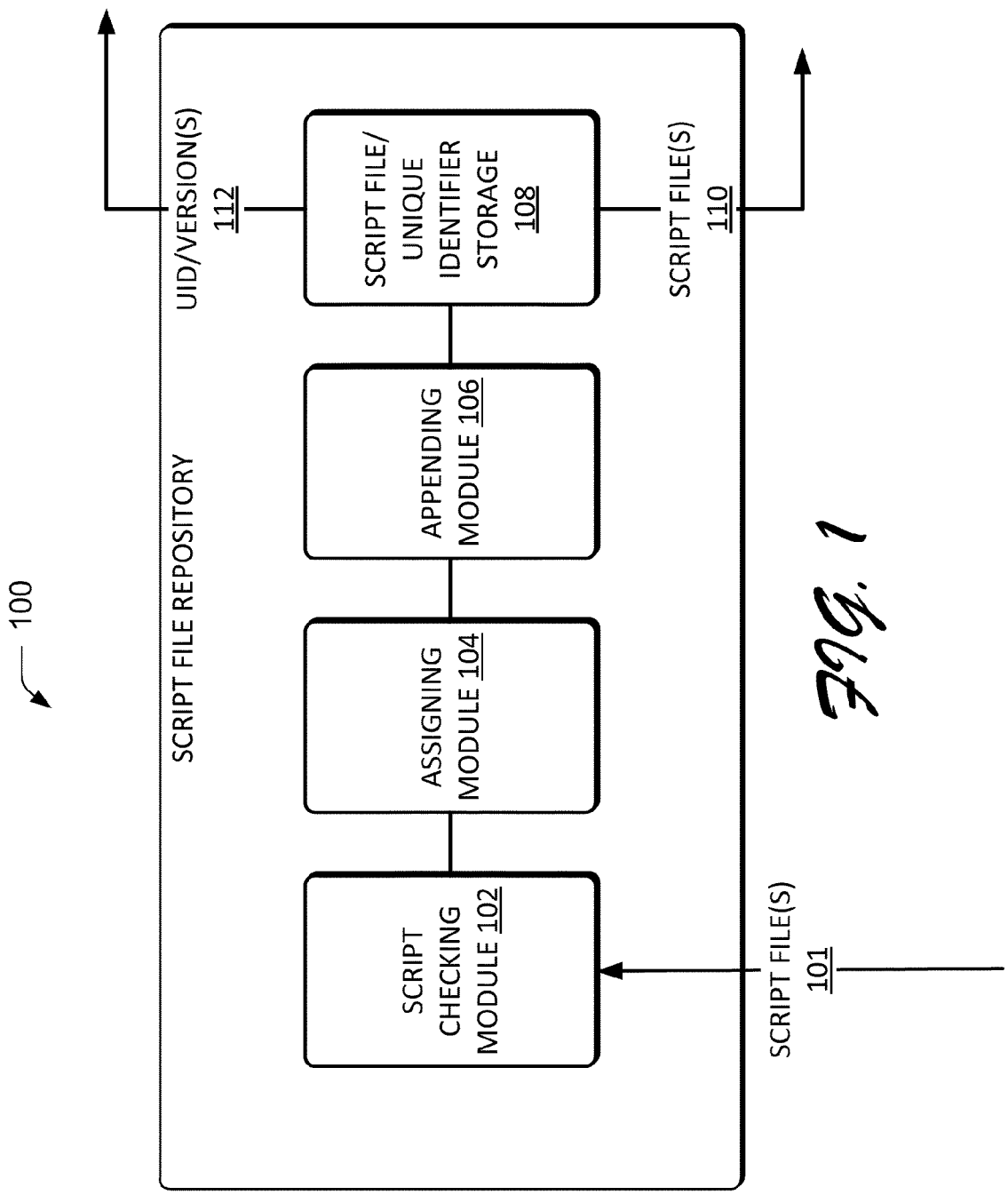
FIG. 1 illustrates an example script file repository according to one or more implementations described herein.

This disclosure describes a script file repository where designers can access script files that can be used to enrich the look and feel of a web page. The script files add logic effects to the web page such as sliding windows, animation, text effects, colors, banners, form validation, scrolling images, partial-submits (via Asynchronous JAVASCRIPT® (AJAX)), and the like. The script file repository according to one or more implementations stores one or more script files, for use in designing the web pages, for example. The script file repository assigns one or more unique identifiers to the one or more script files. The unique identifier can be appended to the uniform resource locator (URL) for the script file. Optionally, the script file repository assigns a version number for the script file that specifies a particular version of the script file. Alternatively, the script author designates the version for the script file. The script file repository makes the unique identifiers and optionally the version numbers available to web document authors. Script files can be obtained from the script file repository using the unique identifier.

This disclosure also describes a computing device that is configured to access a web document that includes a reference to one or more script files. The web document includes the URL for a script file. The web document also includes a unique identifier for the script file appended to the URL. The author of a web document receives the unique identifier for the script file from the script file repository. In one or more implementations, the unique identifier is appended to a src attribute after a # (or hash) character of a <script> tag in the web document. Optionally, a version number or version range is appended to the unique identifier.

If the computing device recognizes the use of a unique identifier for the script file, the computing device obtains the unique identifier from the web document, and uses it to retrieve the desired script from a script repository. The computing device determines whether the script file associated with the unique identifier is located on the computing device itself or at a remote repository. If the script file is located on the computing device, the computing device uses the unique identifier to obtain the script file from itself locally. If the script file is located in a remote script file repository, the computing device obtains the script file from the remote script file repository using the unique identifier.

If the computing device does not recognize the unique identifier, the computing device obtains the script file location information from the address indicated in the src attribute of the <script> tag in the URL in the web document. The computing device obtains the script file from the location indicated in the src attribute. This provides backward compatibility with computing devices that do not recognize the unique identifier. This also provides backward compatibility with computing devices that cannot find the script in a repository or locally on the computing device.

Example Script File Repository

FIG. 1 illustrates an example script file repository 100 according to one or more implementations, from which a computing device can access a script file using a unique identifier and optionally a version range or number. In the illustrated example, a script file input 101 is communicatively coupled to a script checking module 102. The script checking module 102 is communicatively coupled to an assigning module 104, which is communicatively coupled to an appending module 106. The appending module 106 is communicatively coupled to a script file/unique identifier storage 108. The script file/unique identifier storage 108 is communicatively coupled to a script file output 110 as well as script file unique identifier/version output 112.

In one or more implementations, communicative coupling among the script file input 101, the script checking module 102, the assigning module 104, the appending module 106, script file/unique identifier storage 108, the script file output 110, and the unique identifier/version output 112 is a wired connection or a wireless connection. After reading the description herein, a person of skill in the relevant art will be able to implement the communicative coupling.

In one or more implementations, the script file input 101 utilizes any suitable manual data input technology. Examples of manual data input technology include a mouse or a keyboard on a laptop or desktop computer. Other examples include or a touch screen on a tablet computer. In one or more implementations, the script file input 101 is automated and script files are submitted to the script file input 101 electronically, via the internet, for example. The submitter may use hypertext transfer protocol (HTTP), File Transfer Protocol (FTP), or other suitable networking protocol to submit a script file to the script file input 101.

In one or more implementations, the script checking module 102 obtains the script file provided by a script file author/submitter via the script file input 101. The script checking module 102 performs checks on the script file. For instance, the script checking module 102 determines whether a script file that is being submitted to the script file repository 100 is free from malware, such as viruses, worms, etc. The script checking module 102 also determines whether the submitter of the script file is an authorized submitter. The script checking module 102 performs other checks as appropriate on the submitted script files and then determine whether and/or which script files are approved for inclusion in the script file repository 100. In one or more implementations, the script checking module 102 checks to see if the version being submitted has already been submitted, and if so, prompts the submitter as to whether he or she wants to replace the existing version.

If approved for inclusion in the script file repository 100, the assigning module 104 assigns a unique identifier to each of the approved script files. In some implementations, the assigning module 104 assigns a version number or a range of version numbers. Alternatively, the script author designates the version for the script file. The script file will be identified by the unique identifier so that there are no collisions between script files.

For one or more implementations, one unique identifier is assigned to a script file such that each script file in the script file repository 100, and other script file repositories implemented in accordance with the technology described herein, has its own unique identifier. In implementations in which the script files are the same, but the script file versions are different, the unique identifier is the same but a version number is appended to the unique identifier. That is, several script files may have the same unique identifier, but the further-appended version number distinguishes the script files from each other.

In one or more implementations, a script file repository 100 administrator selects a unique identifier for a script file and manually inputs the unique identifier into the assigning module 104. For example, the administrator selects a unique identifier of "0001" for the first approved script file, a unique identifier of "0002" for the second approved script file, unique identifier of "0003" for the third approved script file, and so forth. After reading the description herein a person of ordinary skill in the relevant art will be able to implement the assigning module 104.

The appending module 106 appends the assigned unique identifier to the approved script file. According to one or more implementations, the appending module 106 appends the unique identifier to a src attribute in the <script> tag in the URL for the script file. In implementations in which the assigning module 104 assign a version number or a version range to an approved script file, the appending module 106 appends the version number or version range to the unique identifier.

The script file/unique identifier storage 108 makes known, to the public, for example, that script files are available from the script file repository 100 and that script files can be accessed from the script file/unique identifier storage 108 using the URL of the script file repository 100 plus the unique identifier. Requested script files are via the script file output 110. Requested unique identifiers/versions are via the unique identifiers/versions output 112. The script file script file/unique identifier storage 108 is any suitable storage device that is capable of providing script files and script file unique identifiers, to the public, for example, when requested.

In one or more implementations, a non-authorized user browses the repository 100 looking for one or more scripts of interest. The script repository 100 is readable using protocols such as file transfer protocol (FTP), hypertext transfer protocol (HTTP), a combination of HTTP and Secure Sockets Layer/Transport Layer Security (HTTPS), or the like. Other mechanisms for making known to the public that script files are available from the script file repository 100 include publishing a catalog of sorts as a Resource Description Framework Site Summary (RSS) feed and/or sending out email messages to mailing lists alerting interested parties that a new script or version of a script is available.

Additionally, the script file repository 100 is implemented using hardware, firmware, and/or any combination thereof with software. This includes implementation of the script file input 101, the script checking module 102, the assigning module 104, the appending module 106, the script file/unique identifier storage 108, the script file output 110, and the unique identifier/version output 112.

Example Computing Environment

Figure 2:
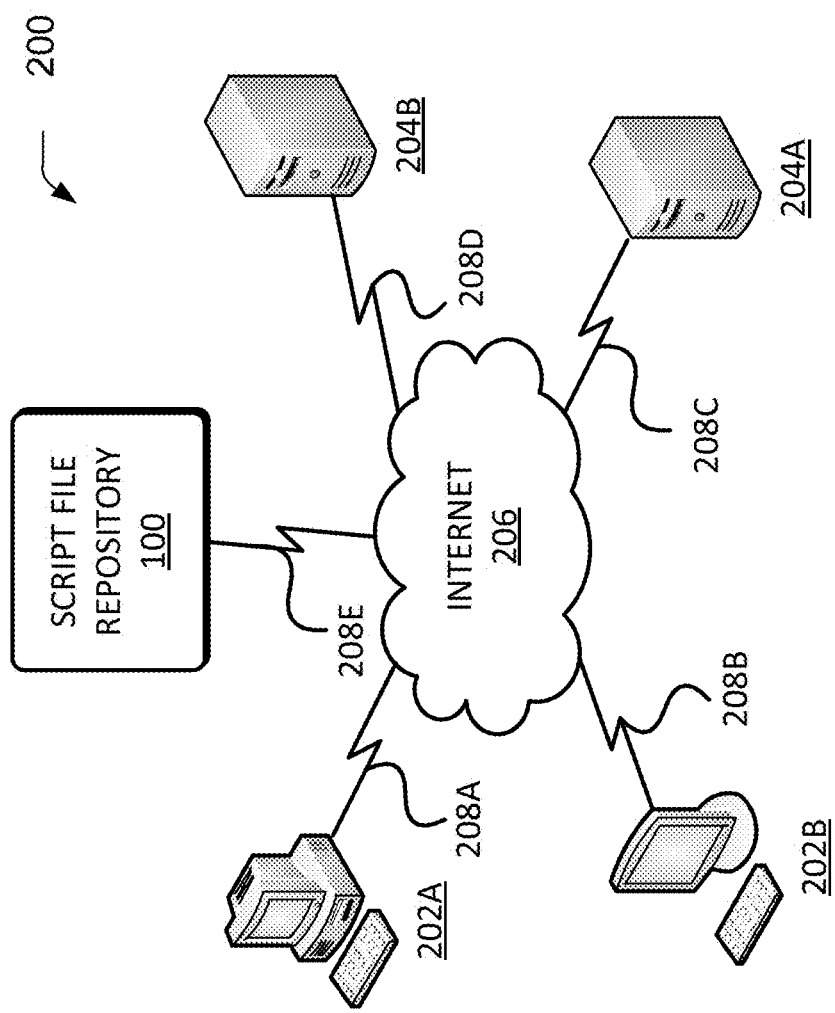
FIG. 2 is a high-level block diagram of a computing environment suitable for one or more implementations described herein.

FIG. 2 is a high-level block diagram of an example suitable computing environment 200 for implementing the technology described herein. The illustrated computing environment 200 includes clients 202A and 202B, servers 204A and 204B, and the script file repository 100 communicatively coupled to each other and to the internet 206. The clients 202A and 202B are communicatively coupled to the internet 206 via links 208A and 208B, respectively, servers 204A and 204B are communicatively coupled to the internet 206 via links 208C and 208D, respectively, and the script library 100 is communicatively coupled to the internet 206 via link 208E.

In one or more implementations, clients 202A and 202B are computing devices, and as such are operated by a user to design web pages using script files as well as by web document authors to prepare web documents. The illustrated computing devices are desktop computers. However, laptop computers, notebook computers, tablet computers, smart phones, and the like, are also suitable computing devices.

The servers 204A and 204B are intended to represent web servers, file servers, and the like.

The internet 206 is intended to represent a wired and/or wireless distributed communication mechanism.

The links 208A, 208B, 208C, 208D, and 208E are intended to represent wired and/or wireless connections that exist between the clients 202A and 202B, servers 204A and 204B, and script file repository 100.

Example Computing Device

Figure 3:
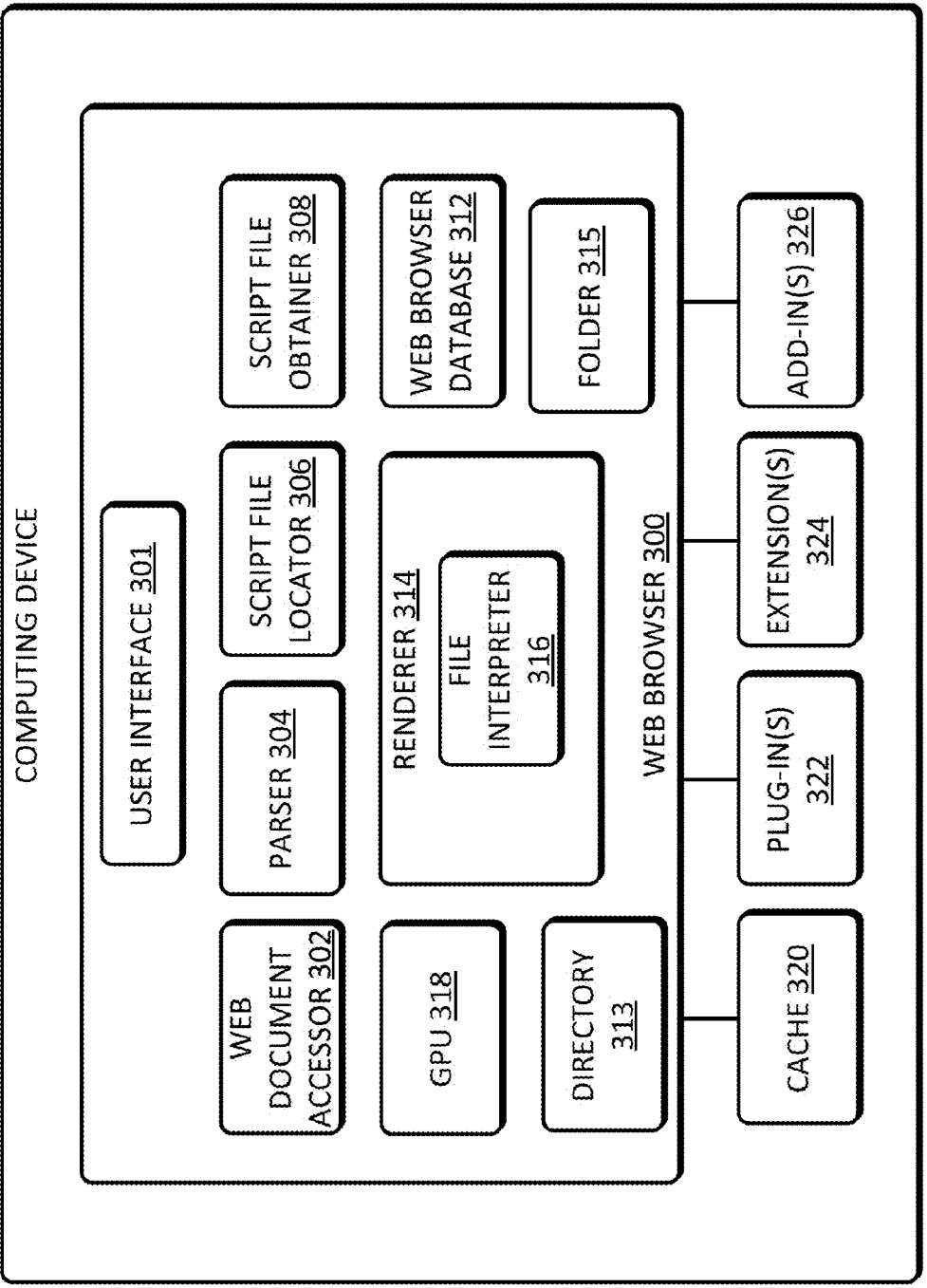
FIG. 3 is a high-level block diagram of a computing device according to one or more implementations described herein.

FIG. 3 illustrates the example computing device 202A in more detail. In the illustrated example, the computing device 202A includes a web browser 300. The illustrated web browser 300 includes a user interface 301, a web document accessor 302, a parser 304, a script file locator 306, a script file obtainer 308, a web browser database 312, a directory 313 a renderer 314, a folder 315, a file interpreter 316, and a graphics processing unit (GPU) 318. The illustrated computing device 202A also includes a cache 320, one or more plug-ins 322, one or more browser extensions 324, and one or more add-ins 326.

The illustrated web browser 300 is used to access a web document and render a web page according to the information in the web document. The user interface 301, web document accessor 302, parser 304, script file locator 306, script file obtainer 308, web browser database 312, renderer 314, file interpreter 316, and graphics processing unit (GPU) 318 facilitate accessing the web document and rendering the web page.

The illustrated user interface (UI) 301 provides an interface between a user and the computing device 202A. The UI 301 processes inputs from a keyboard, a mouse, a touch pad, microphone, or other user input using known techniques.

The illustrated web document accessor 302 is configured to access a web document. The web document has a URL for a script file, a unique identifier for the script file appended to the URL, and/or a version range or number for the script file appended to the unique identifier. In one or more implementations the web document accessor 302 uses hypertext transfer protocol (HTTP), File Transfer Protocol (FTP), or other suitable networking protocol to access a web document.

The illustrated parser 304 is configured to recognize the URL, the unique identifier and/or version range or number for the script file included in the web document. The parser 304 also is configured to obtain the URL, unique identifier, and/or a version range or number from the web document. In one or more implementations, the parser is configured to parse an HTML, Extensible Markup Language (XML), and/or other types of web documents to extract the URL, unique identifier, and/or a version range or number from the web document. In one implementation, the parser 304 includes a script interpreter, which interprets, and/or extracts, the script in the script file. The script files are JAVASCRIPT files, Cascaded Style Sheets, and the like. The parser 304 recognizes the URL along with the unique identifier appended to the <script> tag in the URL after the # (hash) character in the src attribute. In one or more implementations, the parser 304 uses known techniques to extract the URL along with the unique identifier/version.

The illustrated script file locator 306 is configured to determine whether the script file associated with the unique identifier and/or a version range or number is physically located at the computing device 202A and/or at the script file repository 100. In one or more implementations, the script file is located in the directory 313 or the folder 315.

In one or more implementations, the script file is built into the web browser 300. The script file is part of the executable file but is not hard coded into the scripting language that the script file is written in. Instead, the script file is a data file in the web browser 300 (e.g., stored in the cache 320 or the web browser database 312) and is able to be parsed by the parser 304.

In one or more implementations, the script file is a data file that is included in the web browser 300's program installation directory. In one or more implementations, the script file is encrypted, to prevent a virus from altering the script file, for example.

Alternatively, the script file is stored in the remote script file repository 100 described with reference to FIG. 1. In one or more implementations, the web browser 300 is user-configurable such that a user can select one or more specific script file repositories from which to access a script file. The script file locator 306 is configured to determine that the script files are located at those specific script file repositories.

Alternatively, one or more specific script file repositories are hard-coded into the web browser 300. The script file locator 306 is configured to determine that the script files are located at the specific script file repositories that are hard-coded into the web browser 300.

The illustrated script file obtainer 308 is configured to obtain a script file from the computing device 202A. The computing device 202A decides how to obtain the script file based on the information in the obtained web document and the computing device 202A's specific capabilities. In one or more implementations, the script file obtainer 308 obtains the script file from the script file repository 100 using the URL, unique identifier, and/or version range/number.

The computing device 202A also is configured to ignore the unique identifier and/or version. In one or more implementations, the computing device 202A obtains the script file from the location specified in the <script> tag in the URL.

The location from which the script file obtainer 308 obtains the script file from also is configurable by a user of the computing device 202A. There is a menu option on the user interface 301 that allows the user to select the location from which to obtain the script file.

In implementations in which the script file is built into the web browser 300 on the computing device 202A, the script file is parsed by the parser 304 and obtained by the script file obtainer 308 when requested. In another implementation, commonly used script files can be obtained beforehand and stored on local storage by computing device. This local storage can be in addition to caching of obtained script, so that even first accesses to a script are performed quickly.

The illustrated web browser database 312 is configured to store at least one script file in accordance with an implementation. For example, the web browser database 312 stores the script file identified by <script type="test/JavaScript" src="Exhibit B—Sam pleJavaScri pt.js"#jsid=34F9A6B2-2A6D-3356-7D73-26395FA88E71&v2.3"></script>.
Accordingly, the script file can be request from a script repository, which may be located at the same server as specified by the src attribute, or a server other than specified by the src attribute, using unique identifier 34F9A6B2-2A6D-3356-7D73-26395FA88E71&v2.3. Alternatively, if support is not available for script repositories, the URL specified by the "src" attribute can be used to retrieve the script file as would normally occur, since portions of a URL including and after the hash tag are usually not sent to a server.

The illustrated directory 313 is any module configured to store, either virtually or physically, computer files. In one or more implementations, the directory 313 stores a script file.

The renderer 314 handles rendering a web page, such as displaying HTML documents, and/or Cascaded Style Sheets, running scripts, responding to mouse and keyboard events, etc.

The illustrated folder 315 is any module configured to store, either virtually or physically, computer files. In one or more implementations, the folder 315 stores a script file.

The illustrated file interpreter 316 interprets, and/or extracts the script in a script file using techniques known to persons of skill in the art. In one or more implementations, the file interpreter 316 is a Rhino open source script engine, a V8 open source script engine, or a Narcissus open source script engine.

The GPU 318 is used to speed up the rendering of images, text, fonts, and so forth, of the computing device 202A.

The cache 320 is any suitable memory within the computing device 202A capable of storing a script file. For example, in one or more implementations, the cache 320 is a flash drive, a thumb drive, a secure digital memory card, or the like, plugged into the computing device 202A. As depicted, the cache 320 is a hard disk that is physically located in or is otherwise physically and communicatively wired directly to the computing device 202A. Alternatively, the cache 320 is part of a Data Persistence module in the web browser 300.

Some or all of the functionality of web browser 300 is embedded in the plug-in 322, the extension 324, or the add-in 326. For example, the plug-in 322, the extension 324, or the add-in 326 is configured to access a web document that has a unique identifier for a script file, recognize the unique identifier, obtain the unique identifier from the web document, determine whether the script file associated with the unique identifier is located on the computing device 202A or the remote script file repository 100, obtain the script file from the computing device 202A, obtain the script file from the remote script file repository 100, and/or obtain the script file from the location specified in the src attribute of the URL provided in the web document.

Example Web Documents

The following is an example web document according to an implementation. The example web document is a hypertext markup language (HTML) document. However, other web documents are suitable for implementing the technology described herein. Although the below web documents and their descriptions include hyperlinks and/or other forms of browser-executable codes, the hyperlinks and/or other forms of browser-executable codes are not intended to be active links.

```
<html>
<body>
    <script type="test/javascript" src="Exhibit A - SampleJavaScript.js#34F9A6B2-2A6D-3356-7D73-26395FA88E71&v2.3"></script>
        <button onclick="foo( )">Say Hello</button>
</body>
</html>
```

The URL in the above example web document is Exhibit A—SampleJavaScript.js. The unique identifier is 34F9A6B2-2A6D-3356-7D73-26395FA88E71 and is appended after the # (hash) character in the URL. The optional version is 2.3, indicated by v2.3 is appended after the unique identifier. The resulting script file is identified as <script type="test/JavaScript" src="Exhibit A—SampleJavaScript.js"#jsid=34F9A6B2-2A6D-3356-7D73-26395FA88E71&v2.3"></script>.

The following is an example web document according to an alternative implementation of the technology described herein.

```
<html>
<body>
    <script type="test/javascript" src="Exhibit A - SampleJavaScript.js#34F9A6B2-2A6D-3356-7D73-26395FA88E71&v2.3+LEQ4"></script>
        <button onclick="foo( )">Say Hello</button>
</body>
</html>
```

The URL in this alternative example also is Exhibit A—SampleJavaScript.js. This is the same script file thus it has the same unique identifier. The version number for the script file has changed to a range between version 2.3 and 4. As such the unique identifier 34F9A6B2-2A6D-3356-7D73-26395FA88E71 remains appended after the # (hash) character. The optional version range has changed and is a version that is greater than version 2.3 and less than or equal to version 4, and the nomenclature vGT2.3+LEQ4 is used to indicate the version range. GT represents greater than and LEQ represents less than or equal to. The resulting script file is identified as <script type="test/JavaScript" src="Exhibit A—SampleJavaScript.js"#jsid=34F9A6B2-2A6D-3356-7D73-26395FA88E71&v2.3+LEQ4"></script>.

Other example web documents are written using Extensible Markup Language (XML), or other suitable language. Alternative web documents also include an image file, which includes a tag such as <IMG src="shoe.gif"/>. An example Cascaded Style Sheet (CSS) according to an implementation is embedded in a web document using a tag such as <link rel="stylesheet" type="text/css" href="shoemakerstyle.css"/>[Although web documents described above include only a few lines, a script file can have tens, hundreds, and even thousands of lines.

Of course, other files can be stored in the script file repository 100. After reading the description herein a person of ordinary skill in the art will be able to implement a script file repository using other file types.

Example Method for Obtaining a Script File

Figure 4:
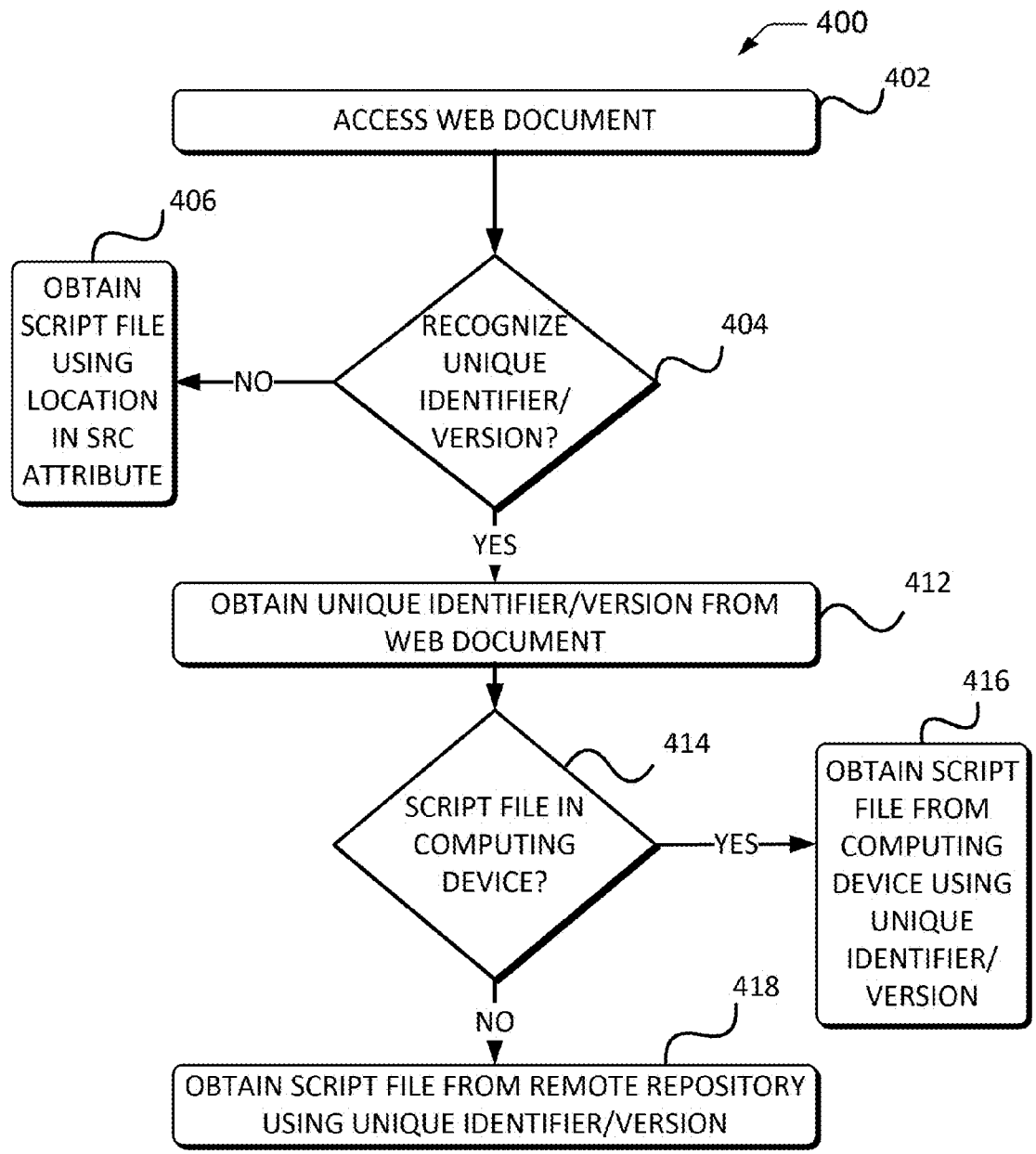
FIG. 4 is a flowchart of a method for utilizing a script file repository according to one or more implementations described herein.

FIG. 4 illustrates a method 400 implemented by a computing device, such as the computing device 202A illustrated in FIG. 3, according to the technology described herein. For example, the web document accessor 302 accesses a web document that has a URL and a unique identifier for a script file. The parser 304 recognizes the URL and unique identifier and obtains them from the web document. The script file locator 306 determines where the script file is located, locally on the computing device, at the script file repository 100, or at a location designated by the URL in the web document. The script file obtainer 308 obtains the script file from the location specified by the script file locator 306, such as from the web browser database 312, the cache 320, the script file repository 100, or other location specified by the URL in the web document.

In a block 402 the computing device 202A accesses a web document. In one or more implementations, the web document accessor 302 accesses a web document that has a URL and a unique identifier and/or a version for a script file.

In a block 404, the computing device 202A determines whether it recognizes the unique identifier and/or a version in the web document. In one or more implementations, the parser 304 recognizes the URL and unique identifier and obtains them from the web document.

Optionally, computing device 202A also determines whether it recognizes a version appended to the unique identifier. In one or more implementations, either the parser 304 recognizes the unique identifier and/or the version, or it does not recognize the unique identifier and/or the version.

If the parser 304 does not recognize the unique identifier, then the method 400 proceeds to block 406 where the script file obtainer 308 obtains the script file from the address specified in the src attribute in the <script> tag in the URL. For instance, in the event that the computing device 202A does not have the capability of recognizing the unique identifier and/or version number, the script file obtainer 308 will still be able to obtain the script file from the location specified in the URL.

If in block 404 the computing device 202A does recognize the unique identifier, then the method 400 proceeds to block 412 in which the parser 304 obtains the unique identifier and/or version from the web document.

In block 414, the computing device 202A determines whether the script file associated with the unique identifier and/or version, is physically located at the computing device 202A. In one or more implementations, the script file locator 306 determines whether the script file is located in the web browser database 312 or in the cache 320. Alternatively, the script file locator 308 determines whether the script file is located in the directory 313 or the folder 315.

If the script file is located on the computing device 202A, the method 400 proceeds to block 416 in which the computing device 202A obtains the script file associated with the unique identifier, and/or version, from the computing device 202A. In one or more implementations, the script file obtainer 308 obtains the script file from the web browser database 312 or the cache 320.

If in block 414 the computing device 202A determines that the script file associated with the unique identifier is physically located at the remote script file repository 100, the method 400 proceeds to block 418 in which the script file obtainer 308 obtains the script file associated with the unique identifier and/or version from the script file repository 100.

The method 400 is illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations. Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

Example Computing Environment

Figure 5:
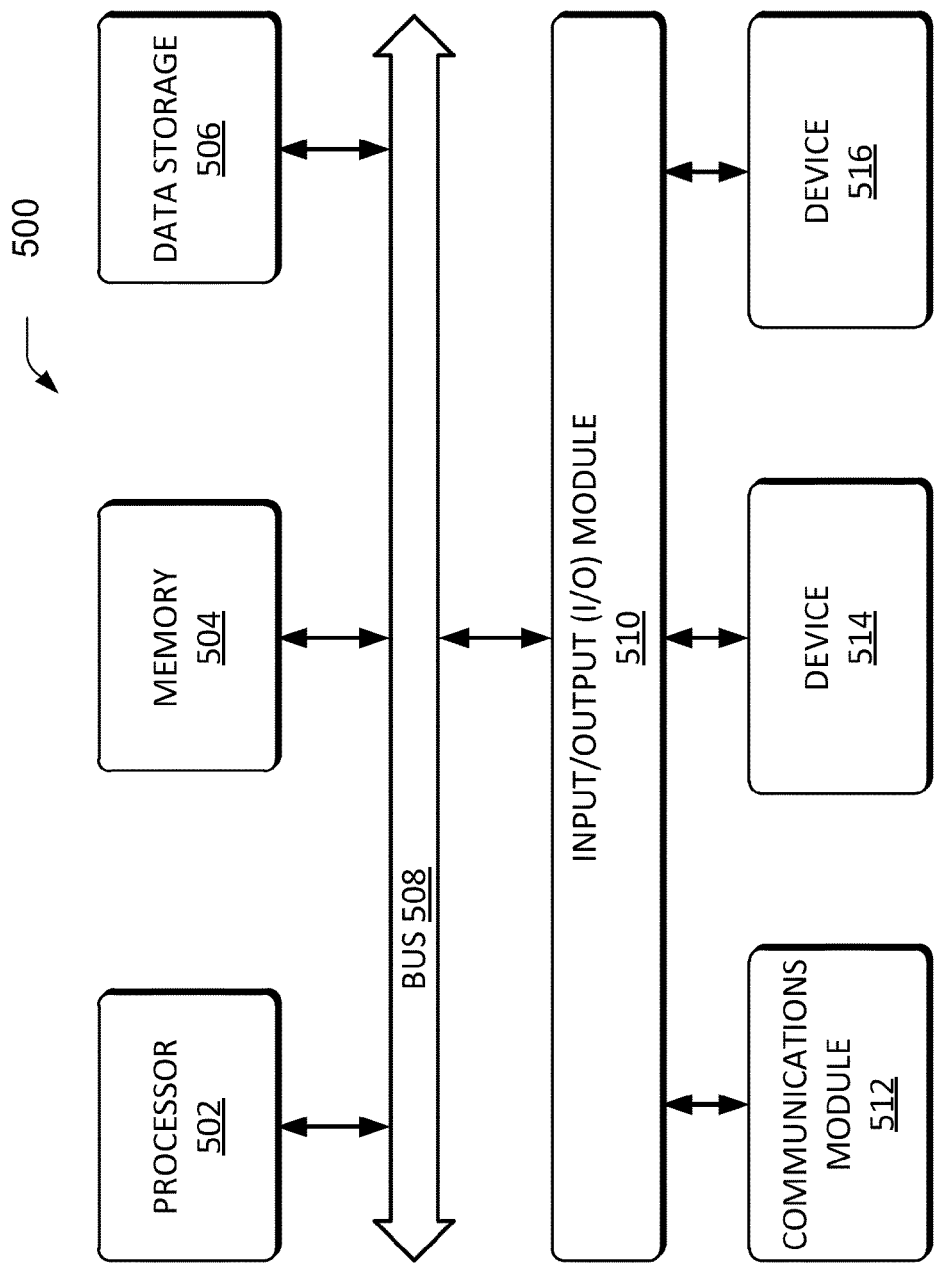
FIG. 5 is a high-level block diagram illustrating an example computer system according to one or more implementations described herein.

FIG. 5 is a high-level block diagram illustrating an example computer system 500 suitable for implementing the script file repository 100 of FIG. 1, clients 202A and 202B, and servers 204A, 204B of FIG. 2. In certain aspects, the computer system 500 is implemented using hardware or a combination of software and hardware.

The illustrated computer system 500 includes a processor 502, a memory 504, and data storage 506 coupled to a bus 508 or other communication mechanism for communicating information. An input/output (I/O) module 510 is also coupled to the bus 508. A communications module 512, a device 514, and a device 516 are coupled to the I/O module 510.

The processor 502 is a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 502 is used for processing information. The processor 502 can be supplemented by, or incorporated in, special purpose logic circuitry.

The memory 504 is Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 502. They memory 504 stores code that creates an execution environment for one or more computer programs used to implement technology described herein. In implementations in which the computing device 202A obtains a script file from one or more of its local caches, the computing device 202A obtains the script file from the memory 504.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions are implemented in one or more computer program products, i.e., one or more sets of computer program instructions encoded on one or more computer readable media for execution by, or to control the operation of, the computer system 500, and according to any method well known to those of skill in the art. The term "computer-readable media" includes computer-storage media. For example, computer-storage media includes, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM))

The data storage 506 is a magnetic disk or optical disk, for example. The data storage 506 functions to store information and instructions to be used by the processor 502 and other components in the computer system 500.

The bus 508 is any suitable mechanism that allows information to be exchanged between components coupled to the bus 508. For example, the bus 508 is transmission media such as coaxial cables, copper wire, and fiber optics, optical signals, and the like.

The I/O module 510 can be any input/output module. Example input/output modules 510 include data ports such as Universal Serial Bus (USB) ports.

The communications module 512 includes networking interface cards, such as Ethernet cards and modems.

The device 514 is an input device. Example devices 514 include a keyboard, a pointing device, a mouse, or a trackball, by which a user can provide input to the computer system 500.

The device 516 is an output device. Example devices 516 include displays such as cathode ray tubes (CRT) or liquid crystal display (LCD) monitors that display information, such as web pages, for example, to the user.

Implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A computing device comprising:
    a web document accessor configured to access a web document, the web document having a uniform resource locator (URL) for a script file and a unique identifier for the script file appended to the URL,
    a parser configured to recognize the unique identifier and to obtain the unique identifier from the web document;
    a script file locator configured to use the unique identifier to determine whether the script file is located at a same server as that specified by the URL for the script file, or that the script file is located in a script file repository located at a different server from that specified by the URL for the script file, the script file repository comprising scripts for a plurality of different web documents; and
    a script file obtainer configured to obtain the script file from the script file repository when the script file locator determines the script file is located in the script file repository.

2. A computing device according to claim 1, further comprising a cache wherein the script file obtainer is further configured to obtain the script file associated with the unique identifier from the cache in response to a determination that the script file associated with the unique identifier has been previously obtained from the script file repository, and a copy is located in the cache.

3. A computing device according to claim 1, further comprising a web browser database wherein the script file obtainer is further configured to obtain the script file associated with the unique identifier from the web browser database in response to a determination that the script file associated with the unique identifier has been previously obtained from the script file repository, and a copy is located in the web browser database.

4. A computing device according to claim 1, wherein:
    the web document accessor is further configured to access a web document having a script file version number appended to the unique identifier, and wherein the version identifies a version of the script file,
    the parser is further configured to recognize the version number and to obtain the version from the web document, and
    the script file obtainer is further configured to obtain the script file associated with the version from the script file repository.

5. A computing device according to claim 1, wherein the parser is further configured to recognize the unique identifier in a <script> tag following a # (hash) character.

6. A computing device according to claim 1, wherein the web document also includes a version for the script file appended to the unique identifier, and wherein the web document accessor is further configured to access the web document using the version for the script file.

7. A computing device according to claim 1, wherein when the unique identifier is unrecognized by the parser, the script file obtainer obtains the script file using an address indicated in a src attribute of a <script> tag in the web document.

8. A method, implemented by a computing device configured to utilize a script file repository, the method comprising:
    accessing, by the computing device, a web document, the web document having a uniform resource locator (URL) for a script file, wherein the web document also includes a unique identifier for the script file appended to the URL;
    recognizing, by the computing device, the unique identifier appended to the URL of the script file;
    obtaining, by the computing device, the unique identifier from the web document;
    determining, by the computing device and based on the unique identifier, whether the script file is located at a same server as that specified by the URL for the script file, or that the script file is located at a script file repository located at a different server from that specified by the URL for the script file; and
    in response to determining that the script file is located at the script file repository, obtaining, by the computing device, the script file from the script file repository using the unique identifier.

9. A method according to claim 8, further comprising executing, by the computing device, the script included in the script file.

10. A method according to claim 8, wherein the unique identifier is appended to the URL after a # (hash) character.

11. A method according to claim 8, wherein in response to the determining, obtaining, by the computing device, the script file from a cache on the computing device using the unique identifier in response to a determination that the script file associated with the unique identifier has been previously obtained from the script file repository, and a copy is located in the cache.

12. A method according to claim 8, wherein in response to the determining, obtaining, by the computing device, the script file from a web browser database on the computing device using the unique identifier in response to a determination that the script file associated with the unique identifier has been previously obtained from the script file repository, and a copy is located in the web browser database.

13. A method according to claim 8, wherein the web document also includes a version for the script file appended to the unique identifier, and wherein accessing the web document by the computing device further includes accessing the version for the script file.

14. A method according to claim 8, wherein the script file repository includes a Cascaded Style Sheet (CSS), and wherein the unique identifier uniquely identifies the CSS.

15. A method according to claim 8, wherein the script file repository includes an image file, and wherein the unique identifier uniquely identifies the image file.

16. A method according to claim 8, wherein the script file is included in a browser extension.

17. A method according to claim 8, wherein the script file is included in a browser executable code.

18. A method according to claim 9, wherein the script file is included in a plug-in.

19. A method according to claim 9, wherein the script file is included in a browser add-in.

20. A method implemented by a computing device configured to utilize a script file, the method comprising:
    accessing, by the computing device, a web document, the web document having a uniform resource locator (URL) for a script file, wherein the web document also includes a unique identifier for the script file appended to the URL;
    determining, by the computing device, that the computing device recognizes the unique identifier appended to the URL of the script file;
    determining, by the computing device and based on the unique identifier, whether the script file is located at a same server as that specified by the URL for the script file, or that the script file is located at a script file repository located at a different server from that specified by the URL for the script file; and
    in response to the determining that the script file is located at the script file repository located at the different server from that specified by the URL for the script file, obtaining, by the computing device, the script file from the script file repository using the unique identifier.

21. A method according to claim 20, wherein accessing the web document by the computing device further includes accessing, by the computing device, a version for the script file, wherein the version for the script file is appended to the unique identifier.

22. A method according to claim 20, wherein when the unique identifier is unrecognizable to the computing device, obtaining the script file using the address included in the URL includes obtaining, by the computing device, the script file using an address indicated in a src attribute of a <script> tag in the web document.

23. One or more non-transitory computer-readable media storing processor-executable instructions that when executed cause one or more processors to perform a method comprising:
    accessing a web document, the web document having a uniform resource locator (URL) for a script file, wherein the web document also includes a unique identifier for the script file appended to the URL;
    determining that the processor recognizes the unique identifier;
    determining, based on the unique identifier, whether the script file is located at a same server as that specified by the URL for the script file, or that the script file is located at a script file repository located at a different server from that specified by the URL for the script file; and
    in response to the determining that the script file is located at the script file repository located at the different server from that specified by the URL for the script file, obtaining the unique identifier from the web document and obtaining the script file from the script file repository using the unique identifier.

24. One or more non-transitory computer-readable media according to claim 23, further comprising in response to the determining, obtaining the script file using an address indicated in the URL.

25. One or more non-transitory computer-readable media according to claim 23, wherein when the unique identifier is unrecognizable to the computing device, obtaining the script file using the address included in the URL includes obtaining the script file using the address indicated in a src attribute of a <script> tag in the web document.

26. One or more non-transitory computer-readable media according to claim 23, wherein the unique identifier is appended to the URL after a # (hash) character.

* * * * *